(12) United States Patent
Uceda-Sosa et al.

(10) Patent No.: US 6,965,892 B1
(45) Date of Patent: Nov. 15, 2005

(54) METHOD, SYSTEM AND PROGRAM PRODUCTS FOR CONCURRENTLY ACCESSING A GLOBAL DATA REPOSITORY BY MULTITHREADED CLIENTS

(75) Inventors: Rosario A. Uceda-Sosa, Hartsdale, NY (US); Gregory D. Laib, Kingston, NY (US); Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 09/584,609

(22) Filed: May 31, 2000

(51) Int. Cl.$^7$ ................................ G06F 7/00
(52) U.S. Cl. .................... 707/8; 707/10; 707/201; 709/203; 709/204; 709/217
(58) Field of Search ............................ 707/202, 7, 8, 707/100, 10, 201; 709/204, 203, 217

(56) References Cited

U.S. PATENT DOCUMENTS

| | | | |
|---|---|---|---|
| 4,887,204 A | * | 12/1989 | Johnson et al. ............... 707/10 |
| 5,727,203 A | * | 3/1998 | Hapner et al. ........... 707/103 R |
| 5,815,701 A | | 9/1998 | Slavenburg .................. 395/591 |
| 5,913,060 A | | 6/1999 | Discavage ................... 395/680 |
| 5,940,827 A | * | 8/1999 | Hapner et al. ................. 707/8 |
| 5,946,685 A | * | 8/1999 | Cramer et al. ................ 707/10 |
| 6,016,490 A | * | 1/2000 | Watanabe et al. .............. 707/8 |
| 6,115,715 A | * | 9/2000 | Traversat et al. ........... 707/100 |
| 6,119,129 A | * | 9/2000 | Traversat et al. ........... 707/202 |
| 6,453,354 B1 | * | 9/2002 | Jiang et al. ................ 709/229 |

FOREIGN PATENT DOCUMENTS

EP          794490         3/1996

* cited by examiner

*Primary Examiner*—John Follansbee
*Assistant Examiner*—Mohammad Siddiqi
(74) *Attorney, Agent, or Firm*—Lawrence D. Cutter, Esq.; Blanche E. Schiller, Esq.; Heslin Rothenberg Farley & Mesiti, P.C.

(57) ABSTRACT

Threads of a multithreaded client application access data in one or more global data repositories via one or more local trees. Each local tree is associated with one or more locked resources of the global data repository. By using the local trees in accessing the data of the global repository, a thread is automatically associated with a lock block and therefore, the granting of locks is independent of any threading models.

18 Claims, 6 Drawing Sheets

__US 6,965,892 B1__

METHOD, SYSTEM AND PROGRAM PRODUCTS FOR CONCURRENTLY ACCESSING A GLOBAL DATA REPOSITORY BY MULTITHREADED CLIENTS

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Method, System And Program Products For Efficiently Locking Resources Of A Global Data Repository," Uceda-Sosa et al., Ser. No. 09/583,797, filed May 31, 2000;

"Method, System And Program Products For Modifying Globally Stored Tables Of A Client-Server Environment," Uceda-Sosa et al., Ser. No. 09/583,585, filed May 31, 2000 U.S. Pat. No. 6,721,742; and "Method, System And Program Products For Concurrent Write Access To A Global Data Repository," Uceda-Sosa et al., Ser. No. 09/584,523, filed May 31, 2000 now U.S. Pat. No. 6,681,225.

TECHNICAL FIELD

This invention relates, in general, to a distributed computing environment, and in particular, to managing the accessing of data located in a global data repository of the distributed computing environment.

BACKGROUND ART

Distributed systems are highly-available, scalable systems that are utilized in various situations, including those situations that require a high-throughput of work or continuous or nearly continuous availability of the system.

Typically, users of a distributed system desire access to data residing in a global repository of the system. These users may be executing complex client applications having multiple threads of processes. In order to prevent corruption of the data, techniques are needed to manage access to the data by the client applications and, in particular, by the multiple threads of the client applications.

Typically, this access management includes obtaining locks (either shared or exclusive) on requested resources of the repository. In particular, a thread of an application that wishes to access one or more resources of the repository obtains locks of those requested resources. These locks are specifically identified and attached with the requesting thread. Thus, it is necessary to tap into understand the threading model of the operating system. This creates complications and makes the locking facilities platform dependent.

Based on the foregoing, a need still exists for a capability that facilitates efficient access to data stored in data repositories.

SUMMARY OF THE INVENTION

The shortcomings of the prior art are overcome and additional advantages are provided through the provision of a method of managing locking of resources of a global data repository of a distributed computing environment. The method includes, for instance, requesting, by a thread of a multithreaded client application of the distributed computing environment, a lock of one or more resources of the global data repository; and obtaining the lock for the thread independent of a threading model of an operating system of the computing environment.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with at least one aspect of the present invention, one or more multithreaded client applications of a distributed computing environment can efficiently access one or more global data repositories of the distributed computing environment. This access employs a locking facility that is independent of the threading model(s) of the threads of the application(s).

Figure 1:
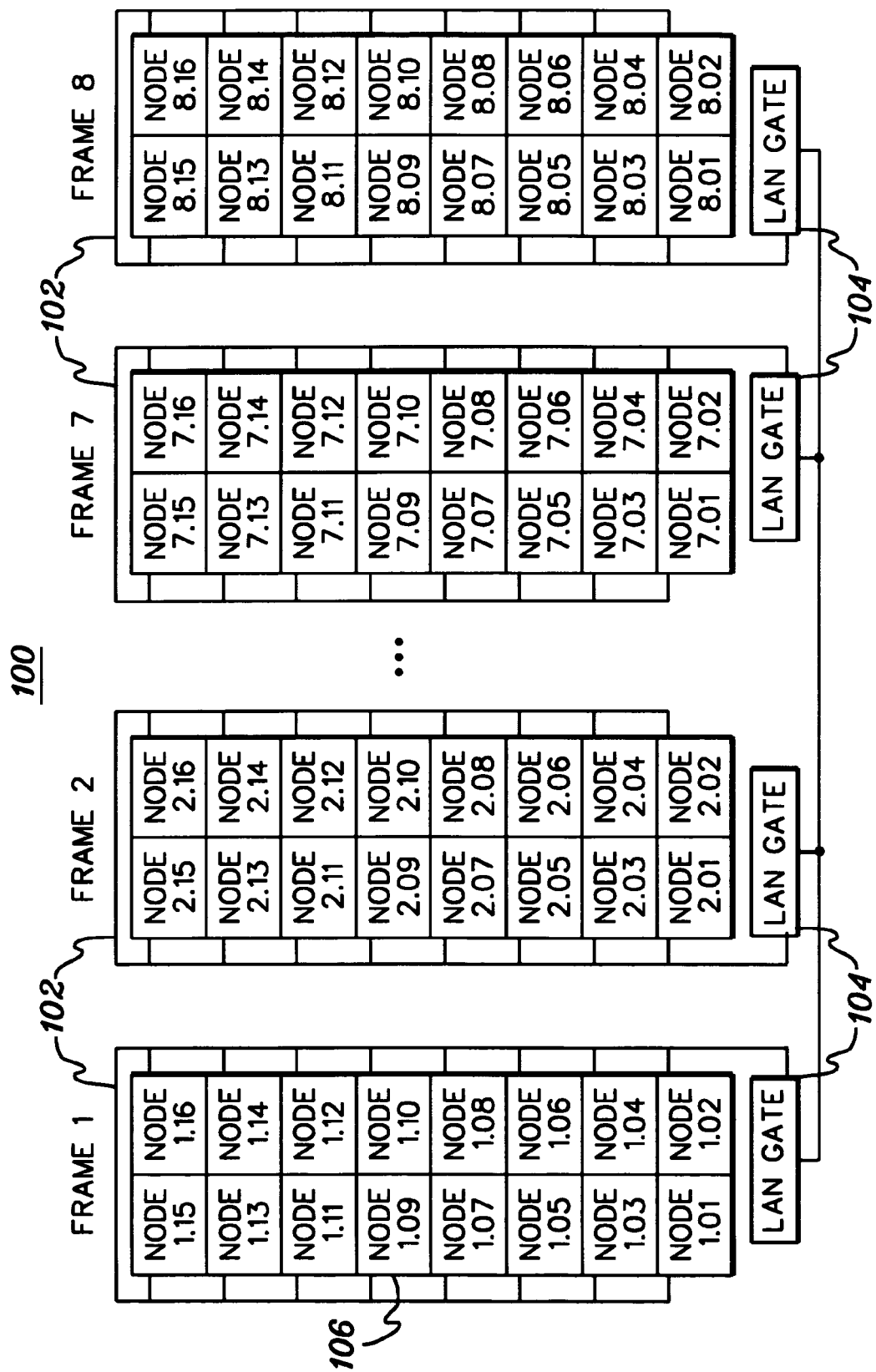
FIG. 1 depicts one example of a computing environment incorporating and using aspects of the present invention.

One example of a distributed computing environment incorporating and using aspects of the present invention is depicted in FIG. 1 and described herein. A distributed computing environment 100 includes, for instance, a plurality of frames 102, coupled to one another via a plurality of LAN gates 104. Frames 102 and LAN gates 104 are described in detail herein.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame, via for example, an internal LAN connection. Additionally each frame is coupled to the other frames via LAN gates 104.

As examples, each LAN gate 104 includes either a RISC/6000 computer, any computer network connection to the LAN, or a network router. However, these are only examples. It would be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. For example, this invention can be employed with LINUX and/or Windows operating systems. Further, a heterogeneous environment can include and utilize aspects of the invention in which one or more of the nodes and/or operating systems of the environment are distinct from other nodes or operating systems of the environment. The nodes of such a heterogeneous environment interoperate, in that they collaborate and share resources with each other. All of these variations are considered a part of the claimed invention.

Figure 2:
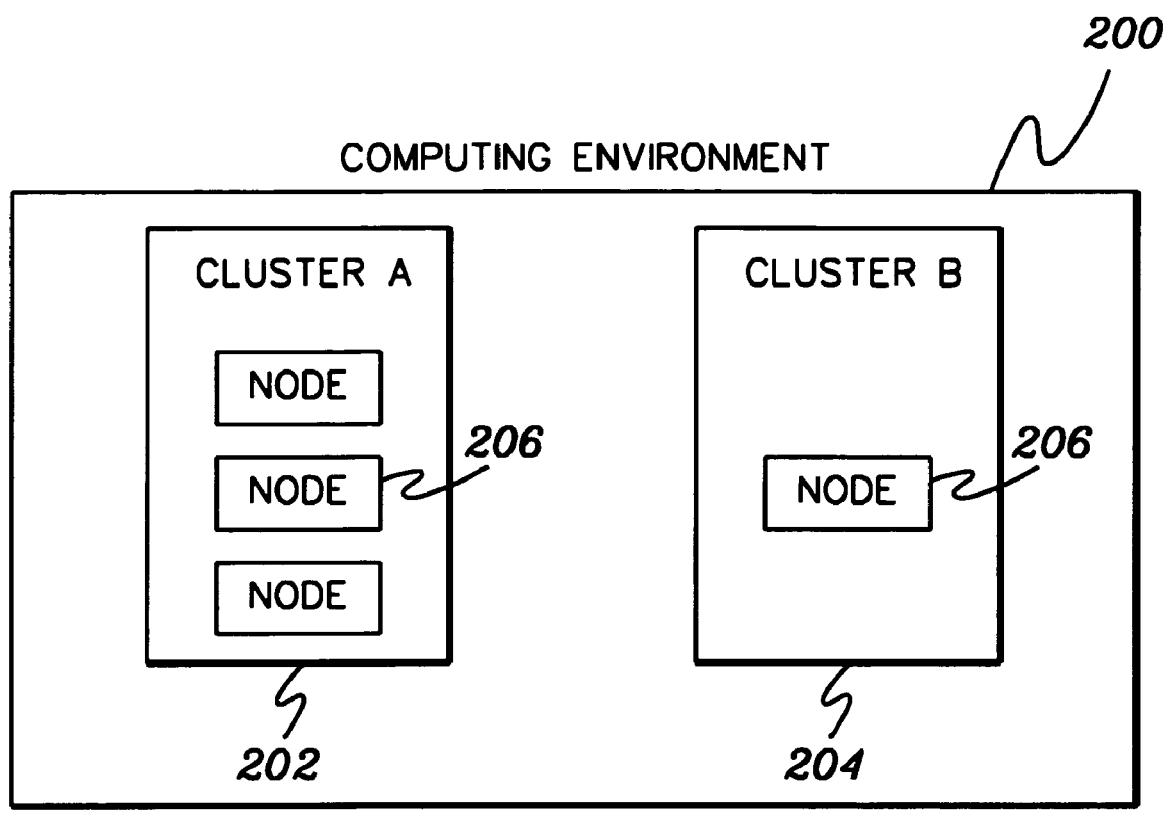
FIG. 2 depicts one embodiment of a computing environment having a plurality of clusters, used in accordance with an aspect of the present invention.

A distributed computing environment, which has the capability of sharing resources is termed a cluster. In particular, a computing environment can include one or more clusters. For example, as shown in FIG. 2, a computing environment 200 includes two clusters: Cluster A 202 and Cluster B 204. Each cluster includes one or more nodes 206, which share resources and collaborate with each other in performing system tasks. Each node includes an individual copy of the operating system.

Each cluster is managed by a cluster architecture, which includes a plurality of components (e.g., a management component, a registry component, a liveness component, a group services component and a resource management component). Each component executes one or more corresponding processes on one or more nodes of a cluster. If the component executes a plurality of processes on a plurality of nodes, then the architecture is distributed across those nodes. One example of a cluster architecture and the management of that architecture is described in detail in a U.S. patent application, entitled "Method, System And Program Products For Managing A Clustered Computing Environment," Novaes et al., Ser. No. 09/583,677, filed May 31, 200, which is hereby incorporated herein by reference in its entirety.

Figure 3:
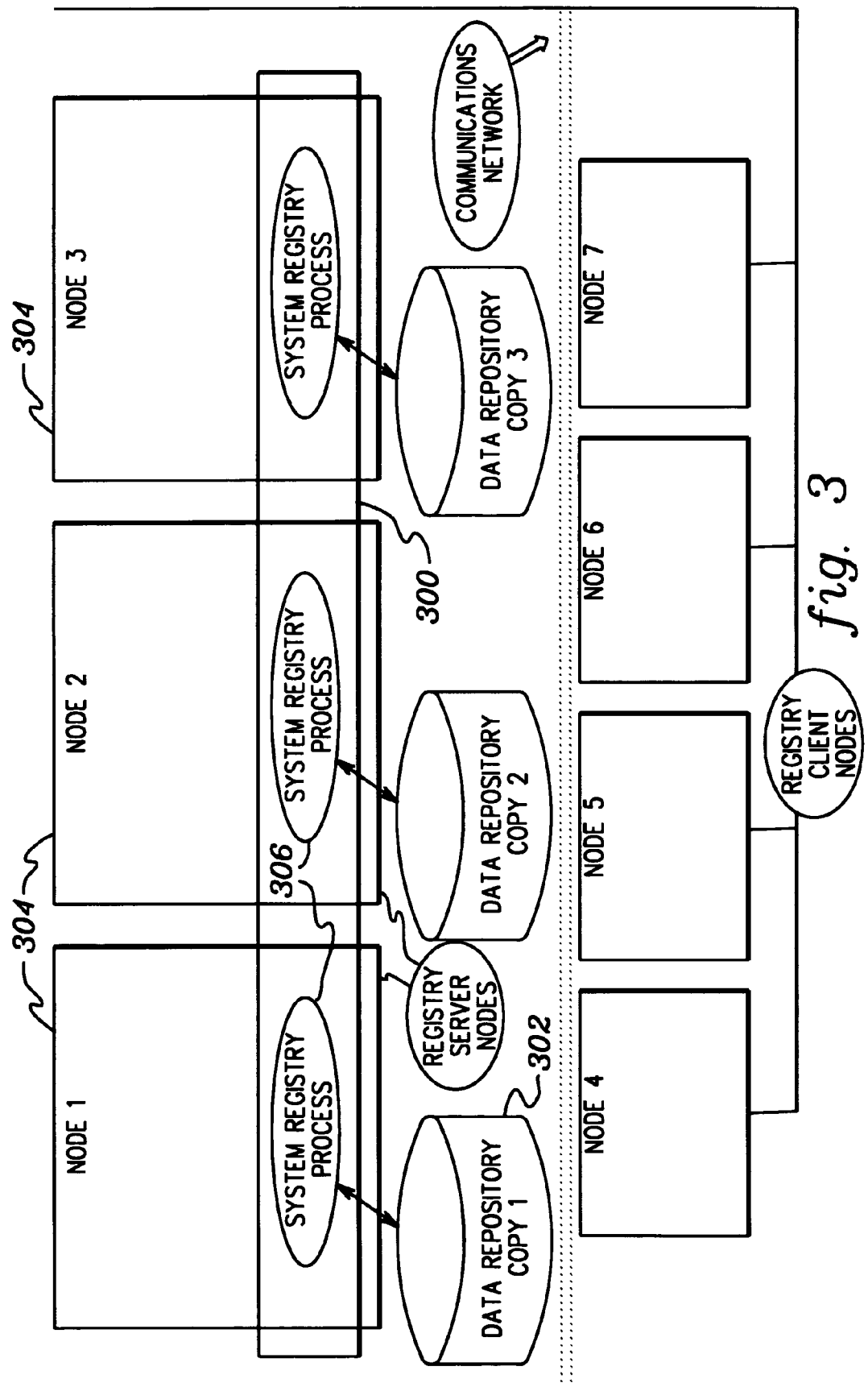
FIG. 3 depicts one embodiment of a computing environment in which a system registry component is located on only a portion of the nodes of the environment, in accordance with an aspect of the present invention.

The nodes of a cluster are capable of sharing resources and data with one another. In one embodiment, in order to facilitate the sharing of data, a system registry component 300 (FIG. 3) is used, which is highly available and provides access to at least one global data repository 302. In one example, system registry 300 is replicated among a plurality of nodes 304, as system registry processes 306. In one embodiment, however, the system registry is replicated on fewer than all of the nodes of a cluster. As shown in FIG. 3, Nodes 1, 2 and 3 include a system registry process 306, while Nodes 4–7 do not. Nodes 4–7 are thus, considered registry client nodes of a client-server environment, while Nodes 1–3 are considered registry server nodes of the environment, since the registry function is executed on those nodes.

The system registry subsystem, along with one or more global data repositories, are regularly accessed by the other components of the cluster architecture. Communication with a data repository is, for instance, connection oriented, since the existence of a session context between a client and a server aids in avoiding unnecessary network traffic.

Figure 4A:
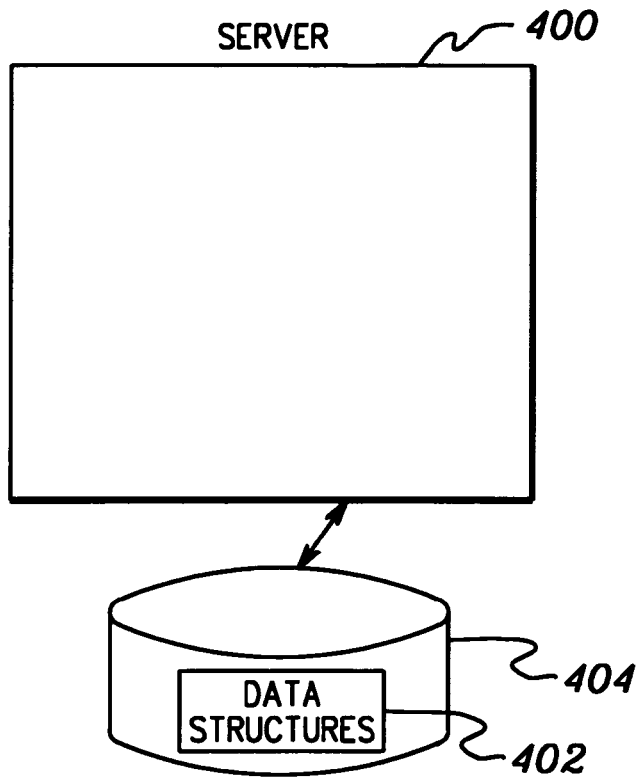
FIG. 4a depicts one example of a global data repository coupled to a server node, in accordance with an aspect of the present invention.
Figure 4B:
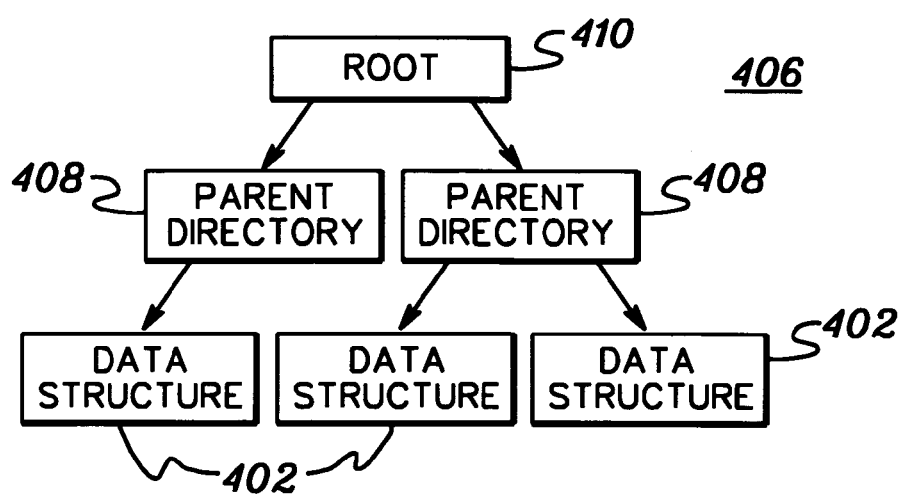
FIG. 4b depicts one example of a global tree structure used in accordance with an aspect of the present invention.

In one embodiment, a registry server node 400 (FIG. 4*a*) stores persistent information, such as configuration data, in one or more data structures 402 (e.g., tables) of a global data repository 404 coupled to the server. The data structures are maintained in a server data tree 406 (FIG. 4*b*) under parent directories 408. The topmost directory of the tree is considered the root of the tree 410. (As one example, each server node stores data in a global data repository, and thus, manages such a server tree. In another example, one or more server nodes store data in one or more data repositories, and thus, manage one or more server trees.)

The registry servers can serve data (e.g., configuration data) relating to one or more different clusters of the computing environment to one or more clients. As examples, each server can serve data for a particular cluster; each server can serve data for one or more clusters; or any combination thereof. To facilitate access of a global data repository, a client application (a.k.a., a process or a user application) executing on, for instance, a client node of the client-server environment links to a Repository Client Library stored on or coupled to the client node. In one example, the Library is dynamically linked (or else the size of the binary could be arbitrarily large causing excessive paging and loss of performance). Further, both the clients and servers share a search and modification engine (an internal library stored on or coupled to the client and server nodes) that implements a complete set of data access services (e.g., retrieve, write, etc.). This allows even a local data structure, including a local data structure that has been extracted from the server, to be manipulated via database functions, as if it was a global data structure.

Client applications are, for instance, multithreaded processes, possibly made up of several linked libraries (themselves multithreaded), which desire access to the data of one or more data repositories. That is, the threads of an application may belong to different, independent libraries and/or other processes of the application. Each of the library threads opens a private connection to a data repository server. This connection may or may not be shared by other cooperating threads outside of the library space. No assumptions can be made as to whether the different libraries (i.e., threads) cooperate in their use of a particular repository. Instead, in accordance with an aspect of the present invention, a facility is provided (including a Data Repository Client Library) which allows cooperating thread patterns (e.g., master-slave or peer patterns), as well as protection of the privacy of libraries, which need access to the repository in an isolated manner.

In addition to the above, in one embodiment, the threads of a client application have access to the same copy of the Client Library, and the Client Library allows access to several contexts of communication with the repository servers.

Each client application (i.e., each thread) can issue single requests against data structures (e.g., tables) of a repository, which are synchronized at a server which manages the particular repository. That is, the server serializes access to a single table, even though several different data structures of a repository can be accessed concurrently. Alternatively, the client application can lock one or more data structures in order to guarantee exclusive access to the locked structures. Locks are mandatory in that the server checks for the presence of locks before granting access to a data structure.

Figure 5:
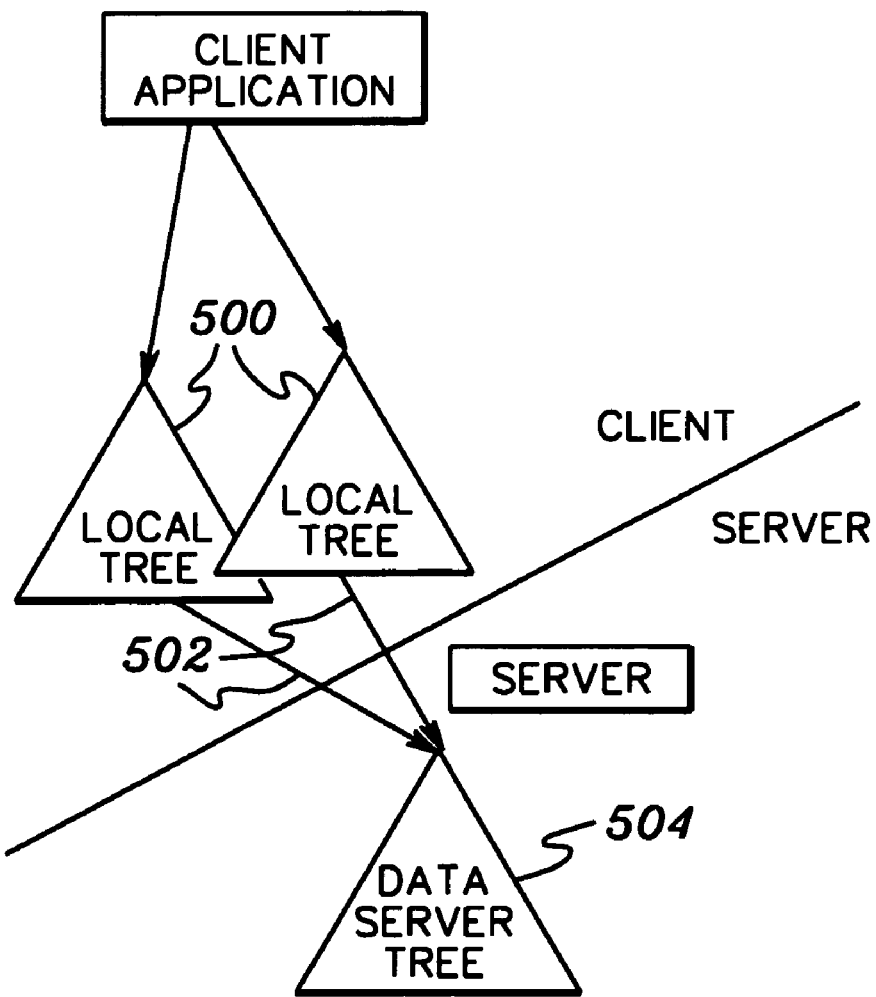
FIG. 5 depicts one example of one or more local trees being mounted to the global tree of FIG. 4b, in accordance with an aspect of the present invention.

To facilitate access to a data repository, a client application (e.g., one or more threads of the application) opens one or more local trees 500 (FIG. 5). A local tree is a data tree that can be opened in the space of the client application by any of its threads. In particular, a thread of the client application forwards an application programming interface (API) function requesting an Open to the Client Library, which creates an empty local tree in the process and provides a root directory.

A local tree can be viewed as a virtual connection that represents the data associated to the connection using the high-level data representation of the data repository itself. When a client application (in particular, a thread) opens a local tree, an empty tree is created and a handle (a unique identifier) is returned to the user. This data tree can then be accessed by any of the threads of the application, which have a copy of its handle. A local tree can also be closed by any of its threads. All of the resources (e.g., tables and/or directories) associated with the local tree are disposed of by the Data Repository Client Library (which includes mount points and lock sets, as indicated below).

At this point, any operation performed on the tree is local. There is no access to the server data. In order to have access to the server data, one or more mounts points 502 are provided. In particular, one or more directories of the local trees are designated as mount points. There can be an arbitrary number of mount points to the same or different servers. A mount operation is associated with a network connection (in one implementation, a TCP stream socket) to the server. Any directory that acts as a mount point is identified with (or acts as a proxy for) the root of the global data server tree 504 to be accessed. This way, the user can access local trees, as if they were remote. In particular, the server data tree is accessed transparently by the user, as if it was part of the local tree.

At any given time, there is, for instance, at most one network connection to a data repository server. That is, all of the mount points that map to the same server tree share the same connection. The Data Repository Client Library keeps a bounded number (e.g., two threads) of threads to handle the incoming and outcoming network traffic, respectively. By using a bounded number of threads, the Client Library does not overthread the client application, thus creating a performance bottleneck. Instead, the connection to a server is decoupled from the virtual context that a library uses in order to work with a server.

It is possible to augment the number of communication threads in order to multiplex over several connections. However, in this embodiment, this number is static, and does not depend on the number of connections currently active. A connection to a server is active, while there is at least one mount point to that server from any of the local trees of the client application. A mount point is closed through an unmount operation on the mount point directory.

Each local tree can be globally accessed by any thread in the client application. Each tree keeps the state of the communication between the client and the server, which includes information about the data repository resources (e.g., tables and directories) accessed and the resources reserved by the local tree. That is, a set of tables is explicitly locked in the server on behalf of a local tree through a lockTables operation. One example of a lockTables operation is described in detail in U.S. patent application entitled "Method, System And Program Products For Concurrent Write Access To A Global Data Repository," Uceda-Sosa et al., Ser. No. 09/584,523, filed May 31, 2000, which is hereby incorporated by reference in its entirety now U.S. Pat. No. 6,681,225.

The set of tables locked, as a result of such an operation, is called a lock set. The return value of a lockTables invocation is a lockId, which can be employed by any of the threads in the client application to use the locked tables of a local tree and/or to unlock the tables of the tree in the server (through, for instance, an unlockTables invocation). Each lock set is associated with the mount point through which it was acquired.

The runtime scope of a lock set is called its lock block. Each thread that accesses the mount point associated with a lock set is considered to be in its lock block. This is determined dynamically at runtime. The thread that issued the lockTables request is automatically in the lock block of this request (if it is successful). For a thread within a lock block, access to any of the global tables outside the lock set is forbidden, in this example (this is to avoid involving one or server repository servers). However, local tables and directories can be freely accessed.

As described above, each local tree has associated therewith a lock block, which is a runtime scope, usable by one or more threads of one or more client applications. The thread that opens that lock block is associated with that lock block. Other threads, however, are not tied to a particular runtime scope or lock block, but instead can dynamically fall into any one of a number of lock blocks. That is, a thread is automatically assumed to be within a lock block, when the thread issues an operation that uses a locked table of a particular lock block of a particular local tree. Again, the lock block is not tied to a thread, but instead to a local tree (with the exception of the thread that opens the lock block). This provides a platform independent locking facility that is further independent of any threading models or policies.

Figure 6:
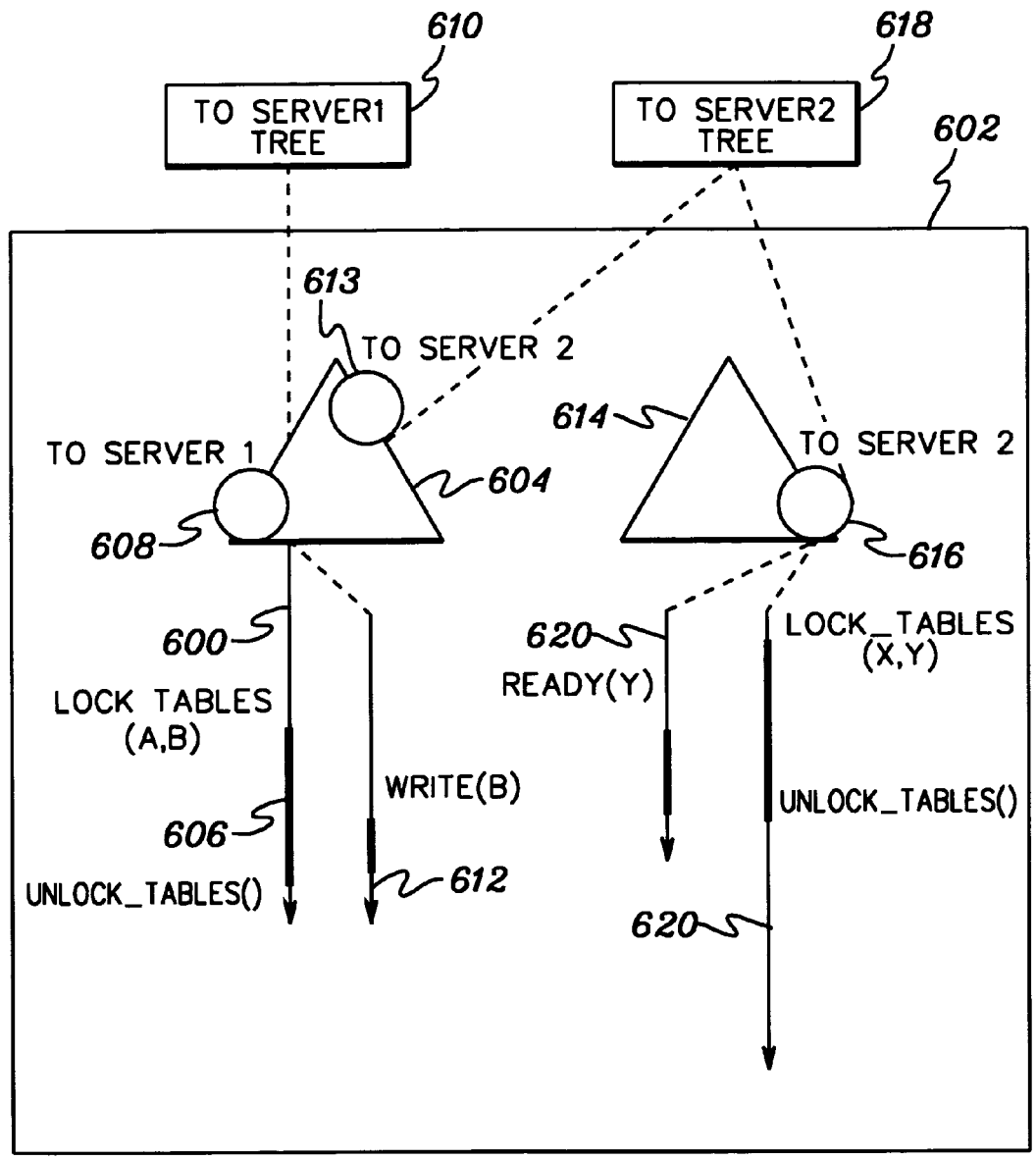
FIG. 6 depicts one example of a multithreaded client application accessing data in server trees via local trees, in accordance with an aspect of the present invention.

One example of multiple threads of a client application using local trees to access data of a global data repository is described with reference to FIG. 6. A thread 600 of a client application 602 issues a lockTables function in order to lock Table A and Table B of Server 1 on behalf of a local tree 604. The lockTables invocation creates a lock block 606, which is associated with local tree 604. Local tree 604 includes at least one mount point 608, which is used to connect the local tree to a server data tree 610 of the global data repository. The server data tree is associated with the requested tables, Table A and Table B.

This lock block is open until an unlockTables function is issued for those particular tables. During this lock block one or more other threads, such as thread 612 of the client application can use a locked table (e.g., Table B) of the lock set. This thread accesses the table via a mount point (e.g., mount point 608) of local tree 604.

Further, local tree 604 can include one or more mount points 613 to data of one or more other server trees.

Additionally, client application 602 can have other local trees (such as local tree 614), which may have one or more mount points 616 to one or more server trees 618. One or more threads 620 can access server tree 618 using the lockId obtained on behalf of local tree 614. This local tree is associated with, for instance, Table X and Table Y.

In accordance with an aspect of the present invention, the Data Repository Client Library is providing a mechanism, whereby threads of one or more applications can either cooperate in their access to the data repository by sharing one or more local data trees, or can work on privately owned trees. In one embodiment, cooperating processes are not to issue synchronization primitives while holding locks. Since these cases are difficult to detect from the Client Library, this deadlock prevention mechanism in the client's side is to be complemented in the server, by a loop detection technique in the server.

Furthermore, threads are deadlock free by using the rules provided herein to avoid deadlocks at the Client Library. For example, the facility described above avoids intra-server and inter-server deadlocks by eliminating the wait and hold condition. Threads are lazily captured by the lock block, as necessary. Once the lock set is eliminated, the threads are free to be captured by any other lock blocks. The Client Library keeps track of each lock set on the mount point. Each lock set has a list of threads associated therewith.

In the embodiment described herein, the one or more global data repositories are remote from the nodes. However, in other examples, each repository can be local to one or more nodes. Further, each repository can be remote or local to users of the respository.

Described in detail above is a facility that supports various types of cooperation semantics in a client application. Further, although the embodiments herein are described in terms of a data repository, the capabilities of the present invention are equally applicable to other components. For instance, the capabilities are usable by client-server systems that have global infrastructure components to be concurrently accessed by multithreaded clients, without assuming a particular threading model adopted by the client applications.

While a clustered environment is provided as one example, the invention is not limited to such an environment. Further, one or more aspects of the present invention are applicable to homogeneous systems, as well as heterogeneous systems. As one example, capabilities are provided to facilitate the interoperability of the systems of a heterogeneous environment.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing locking of resources of a global data repository of a distributed computing environment, said method comprising:

issuing a request, via a thread of a multithreaded client application of said distributed computing environment, for a lock of a resource associated with a server data tree of said global data repository; and obtaining said lock for said multithreaded client application, said lock being independent of a threading model of the requesting thread of the multithreaded client application of said distributed computing environment, wherein said obtaining comprises employing a local tree in obtaining said lock, said local tree being local to the client application and having a mount point usable by the client application to lock said resource via the server data tree, said local tree comprising a data tree accessible by a plurality of threads of the multithreaded client application, and wherein said resource is further lockable via another mount point of one of said local tree and another local tree.

2. The method of claim 1, wherein the connecting comprises connecting the local tree to the server data tree via a mount point on the local tree.

3. The method of claim 1, wherein the issuing comprises issuing a request for a lock of at least one table of the global data repository.

4. The method of claim 1, wherein the issuing comprises issuing the request from a server associated with said resource.

5. The method of claim 1, further comprising unlocking said resource by the thread of the multithreaded client application.

6. The method of claim 1, further comprising using said resource by another thread of the multithreaded client application.

7. A system of managing locking of resources of a global data repository of a distributed computing environment, said system comprising:

means for issuing a request, via a thread of a multithreaded client application of said distributed computing environment, for a lock of a resource associated with a server data tree of said distributed global data repository; and means for obtaining said lock for said multithreaded client application, said lock being independent of a threading model of the requesting thread of the multithreaded client application of said distributed computing environment, wherein said means for obtaining comprises means for employing a local tree in obtaining said lock, said local tree being local to the client application and having a mount point usable by the client application to lock said resource via the server data tree, said local tree comprising a data tree accessible by a plurality of threads of the multithreaded client application, and wherein said resource is further lockable via another mount point of one of said local tree and another local tree.

8. The system of claim 7, wherein the means for connecting comprises means for connecting the local tree to the server data tree via a mount point on the local tree.

9. The system of claim 7, wherein the means for issuing comprises means for issuing a request for a lock of at least one table of the global data repository.

10. The system of claim 7, wherein the means for issuing comprises means for issuing the request from a server associated with said resource.

11. The system of claim 7, further comprising means for unlocking said resource by the thread of the multithreaded client application.

12. The system of claim 7, further comprising means for using said resource by another thread of the multithreaded client application.

13. At least one program storage device readable by a machine, tangibly embodying at least one program of instructions executable by the machine to perform a method of managing locking of resources of a global data repository of a distributed computing environment, said method comprising:

issuing a request, via a thread of a multithreaded client application of said distributed computing environment, for a lock of a resource associated with a server data tree of said global data repository; and obtaining said lock for said multithreaded client application, said lock being independent of a threading model of the requesting thread of the multithreaded client application of said distributed computing environment, wherein said obtaining comprises employing a local tree in obtaining said lock, said local tree being local to the client application and having a mount point usable by the client application to lock said resource via the server data tree, said local tree comprising a data tree accessible by a plurality of threads of the multithreaded client application, and wherein said resource is further lockable via another mount point of one of said local tree and another local tree.

14. The at least one program storage device of claim 13, wherein the connecting comprises connecting the local tree to the server data tree via a mount point on the local tree.

15. The at least one program storage device of claim 13, wherein the issuing comprises issuing a request for a lock of at least one table of the global data repository.

16. The at least one program storage device of claim 13, wherein the issuing comprises issuing the request from a server associated with said resource.

17. The at least one program storage device of claim 13, further comprising unlocking said resource by the thread of the multithreaded client application.

18. The at least one program storage device of claim 13, further comprising using said resource by another thread of the multithreaded client application.

* * * * *